S. W. KIRK.
Mill Bolt.
No. 8,248.
Patented July 22, 1851.
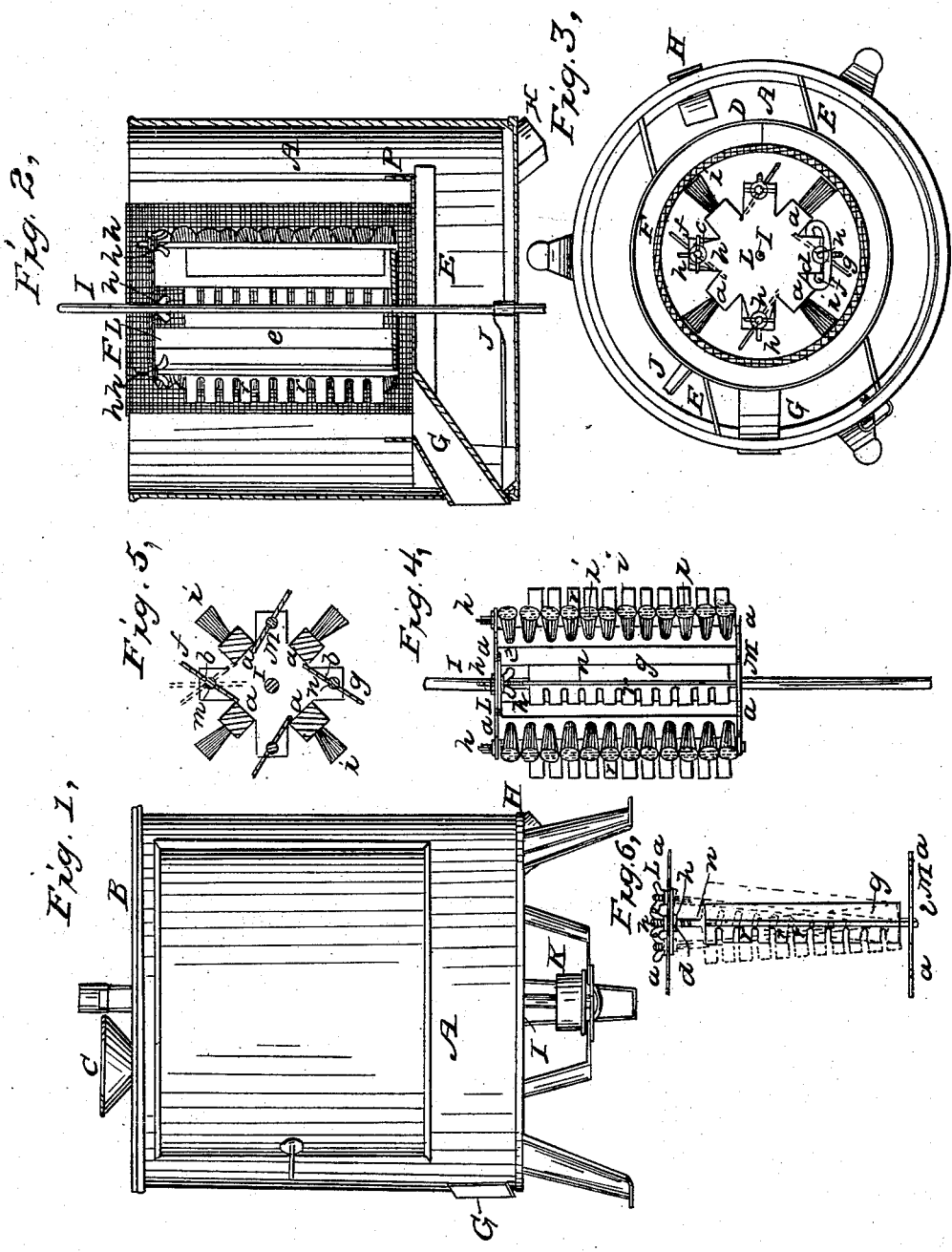

UNITED STATES PATENT OFFICE.

SOLOMON W. KIRK, OF COATESVILLE, PENNSYLVANIA.

IMPROVEMENT IN BRAN-DUSTERS.

Specification forming part of Letters Patent No. 8,248, dated July 22, 1851.

*To all whom it may concern:*

Be it known that I, SOLOMON W. KIRK, of Coatesville, in the county of Chester and State of Pennsylvania, have invented certain new and useful improvements in machines for dressing flour or for cleaning, sifting, and separating pulverized grain of various kinds and other substances; and I do hereby declare that the following is a full, clear, and exact description of the same, reference being had to the accompanying drawings, forming part of this specification, in which—

Figure 1 is an outside elevation of the machine. Fig. 2 is a sectional elevation of the machine in part. Fig. 3 is a plan with the lid or cover removed. Fig. 4 is a detached elevation of the revolving reel with brushes and wings or vanes attached thereto. Fig. 5 is a transverse section of the same, and Fig. 6 is a detached elevation of one of the wings attached to the upper and lower disks of the reel in illustration of one mode of action or varying workable position of the wings or vanes in relation to the reel.

The same letters of reference denote similar parts in each of the several figures.

The nature of my invention consists in the employment of vanes situated between the rails or bars of a revolving vertical reel carrying the brushes, the vanes being formed double-leafed, the front or outside leaf of each made, if desired, of comb form with teeth by grooves cut in them, and the said vanes (each one) hung or supported on a vertical axis that admits of them being turned to any required angle, and so attached (if desired) to the disks of the wheel as to be capable of being set more or less out of the perpendicular, which modes of adjustment serve to regulate the operation of the vanes upon the meal or other substance passing through, also to retard or quicken its flow or passage.

To enable others skilled in the art to make and use my invention, I will proceed to describe its construction and operation.

A is the outer case of a vertical flour-dressing machine, and B its lid or cover.

C is the feed-hopper.

D is a table carried by connecting-strips E E for supporting at the required distance from the bottom of the outer case the wire-cloth frame or screen F, which may be made, as usual, in halves.

G is the delivery-outlet for the bran or offal, communicating with the interior of the screen, and H the delivery-outlet for the flour from the outer case.

I is the vertical revolving reel-shaft, having a strike or arm J attached to it near the bottom within the outer case for clearing out the flour through the delivery-outlet, the shaft I being driven by the pulley K, Fig. 1.

L is the upper disk of the revolving reel, and M the lower disk of the same. They are secured firmly to the shaft I, and are made with suitable projections, pieces, or arms $a\ a$ $a\ a$, $b\ b$, $c$, and $d$ for carrying the brush-rails $e\ e$ and wings or vanes $f\ g$.

$i\ i$ are the brushes secured to and projecting outward from the rails $e\ e$, which, being made fast to the disks, cause the brushes to revolve and sweep or drive the flour through the wire screen F. The vanes $f\ g$ are made double-leafed, being hung to or having axes $m\ n$, that fit and turn in the arms or pieces $c\ d\ b\ b$, being secured thereto and fixed to the disks at the particular or required set by thumb-nuts $h\ h\ h\ h$, screwing on the axes $m\ n$. The front or outside leaves of the several vanes have horizontal grooves cut in them, which form teeth $r\ r\ r$ and constitute in effect a comb.

The mode of attaching the axes $m\ n$ may be either as shown by the use of projections or pieces $c$ or $d$, according to the required direction of the set of the several vanes, the projection $c$ serving only to admit of the axis $m$ of the vane $f$ to be turned, so as to fix the outer leaf of the vane nearer or farther from the screen and cause the double leaf to strike and fan the meal at a suitable and variable angle, as shown by red and blue lines, Fig. 5, both leaves of the vane being perpendicular, while the piece $d$, attached to the upper disk, is formed of an arc shape with a groove $s$ in it that not only admits of the vane $g$ being operated and turned in the same manner as described in the set of the vane $f$, but also allows of it being set more or less out of the perpendicular by the travel of the upper end of the axis $n$ along the groove $s$, the axis so fitting into the lower disk as to admit of this, whereby the vane will serve to obstruct or regulate the swiftness in fall of the meal down within the screen, the several vanes (of which, as well as brushes, there may be any number) being attached to the disks either as described in the mode of securing the vane $f$ or as referred to in that of the vane $g$, according to the necessities of the machine as requiring one or both sets. Thus the meal, being entered through the feed-hopper C into the screen F, is not only acted upon by the brushes and vanes in the ordinary way of sweeping and fanning through the blast produced in the revolution of them, but without varying the velocity of the reel. The operation upon the meal is varied or regulated by adjustment in the set of the vanes, the alteration of set, as described, in the mode of attaching the vane $f$ serving not only to increase or lessen the blast, but to throw the meal more or less forcibly against the screen, also lessening or increasing the resistance met with by the vanes, and otherwise so working the meal as circumstances may require, while if the vanes be attached as described in the mode referred to in description of the vane $g$ then not only will the foregoing effects be capable of being produced through turning the vanes, as with $f$, but by throwing the vanes on either side out of the perpendicular, as indicated by red and blue lines in Fig. 6, showing the vane $g$ thus set, (as produced through the travel of the upper end of the axis $n$ in the groove $s$.) The vanes thus attached will also serve to regulate the passage of the meal down within the screen by causing the sides or surfaces of the leaves of the several vanes to obstruct the fall, and the inclined position of the vanes thus set having a tendency to increase this effect by the direction upward they give to the blast.

The teeth $r\ r\ r$ of the outer leaf of the several vanes serve as combs to separate the meal and prevent it clogging, which the brushes in being flexible only partially do. By these improvements the meal will be more effectually and easily operated on whatever may be the condition of it, as influenced by damp, the atmosphere, overheated millstones, or other causes, and a coarser or finer description of flour made, as desired, by means of the adjusting arrangements described.

The flour is delivered, as usual, through the interstices of the screen F into the case A, where it is swept by the revolving strike or arm J through the delivery-outlet H, while the bran or coarser flour falls to the bottom of the screen and is delivered through the outlet G. Appropriate-sized meshes being used, firsts, seconds, thirds, flour, and pollard, as usual, may be made.

I do not claim, exclusively, the employment of intermediate vanes acting in connection with the brushes on the reel for forming a blast, as such has already been used; but What I do claim as my invention, and desire to secure by Letters Patent, is—

The employment of adjustable vanes, which may be set in or out and obliquely in direction of their length, or be set either way only, as described and represented by the vanes lettered $f\ g$ in the drawings, such adjustable vanes acting in combination with the brushes on the reel, for the purposes and in the manner substantially as set forth.

S. W. KIRK.

Witnesses:
S. H. WALES,
EL. POLHAMUS.